United States Patent [19]
Timian

[11] 3,733,639
[45] May 22, 1973

[54] RENOVATOR

[76] Inventor: Martin R. Timian, 1518 7th, Bremerton, Wash. 98310

[22] Filed: Oct. 19, 1970

[21] Appl. No.: 82,011

[52] U.S. Cl. .................. 15/304, 15/308, 15/311, 15/345
[51] Int. Cl. ............................................. A47l 5/14
[58] Field of Search .................. 15/303, 304, 306 R, 15/308, 310, 311, 352; 55/291, 294, 302

[56] References Cited

UNITED STATES PATENTS

| | | | |
|---|---|---|---|
| 2,038,134 | 4/1936 | Schiffner | 15/304 |
| 2,242,901 | 5/1941 | Birch | 15/306 R |
| 2,591,198 | 4/1952 | Ringe | 15/304 X |
| 3,004,276 | 10/1961 | Hoffman | 15/306 R |
| 3,510,905 | 5/1970 | Bannert | 15/345 |
| 3,538,926 | 11/1970 | Nesbitt | 15/304 X |

*Primary Examiner*—John Petrakes
*Assistant Examiner*—C. K. Moore

[57] ABSTRACT

A cleaning apparatus for an automobile air cleaning element, the device comprising a housing with a removable cover plate so to position an automobile air cleaner unit there within, a spring-supported element support and a unit foundation there below, and an air line delivering air to a revolving air distributor while the housing is connected by a flexible hose to a vacuum cleaner, and a vibrating motor below the spring-supported element support, the motor having an extension cord therefrom for being connected to an electric power supply.

1 Claim, 3 Drawing Figures

INVENTOR
MARTIN R. TIMIAN

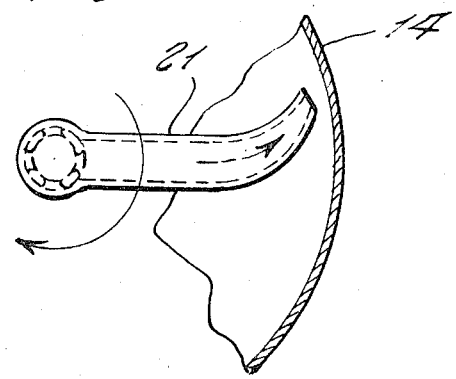
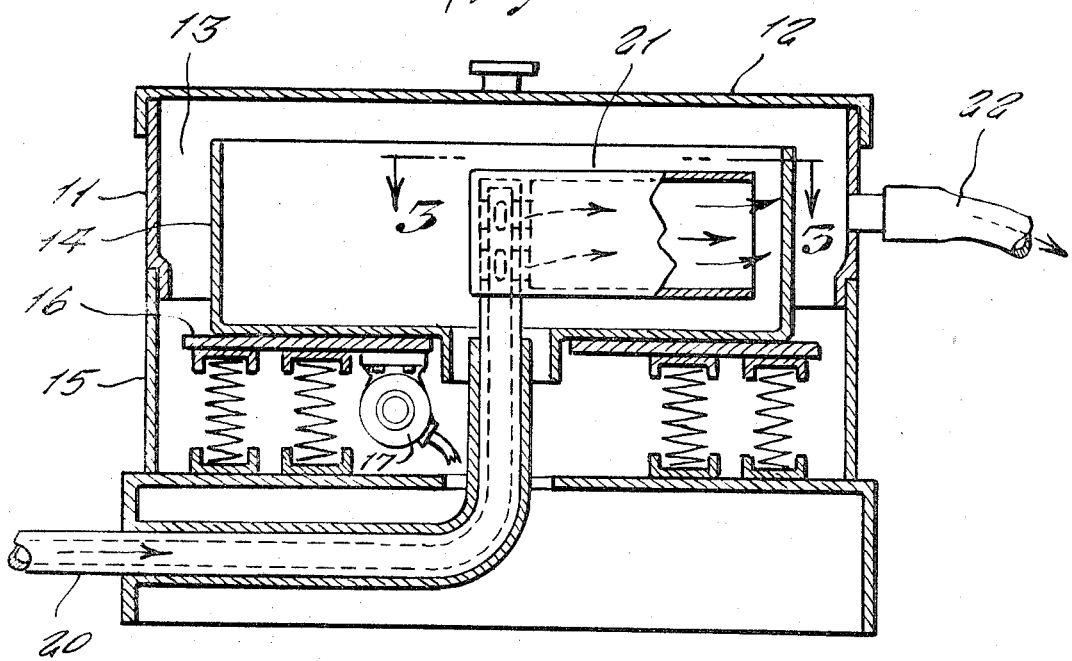

RENOVATOR

This invention relates generally to cleaning equipment.

A principal object of the present invention is to provide a cleaning apparatus for the purpose of cleaning the automobile air cleaning element.

Another object of the present invention is to provide an automobile air cleaning element cleaner which will renovate the automobile air cleaning element in a thorough manner by completely removing all dust and dirt therefrom.

Another object of the present invention is to provide a renovator which incorporates vibration, a central air blast and a vacuum which together perform the complete cleaning operation.

Other objects of the present invention are to provide a renovator which is simple in design, inexpensive to manufacture, rugged in construction, easy to use and efficient in operation.

These and other objects will be readily evident upon a study of the following specification and accompanying drawing wherein:

FIG. 1 comprises a perspective view of the present invention shown in operative use.

FIG. 2 is a cross-sectional view taken on line 2—2 of FIG. 1.

FIG. 3 is a cross-sectional view taken on line 3—3 of FIG. 2.

Figure 1:
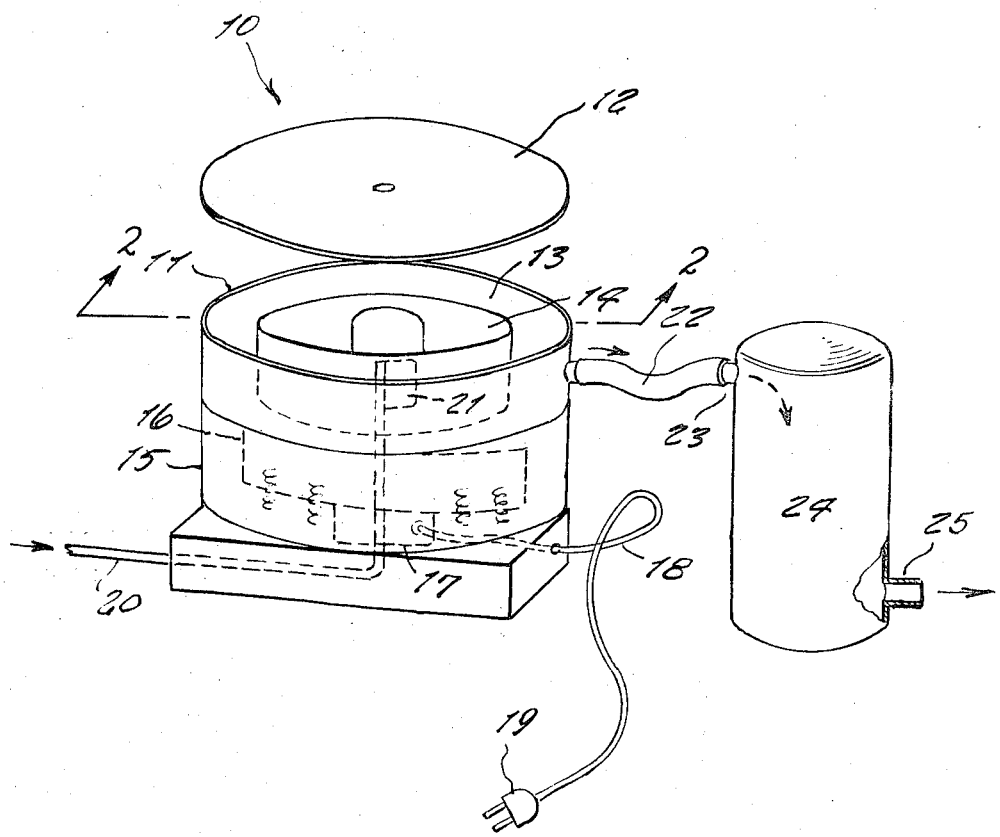

Referring now to the drawing in detail, the reference numeral 10 represents a renovator cleaner for cleaning an automobile air cleaning element according to the present invention wherein there is a cylindrical configurated housing 11 which is surmounted by a removable cover plate 12 so as to enclose a central chamber 13 within which there may be removably positioned an automobile air cleaner unit 14 which is intended to be renovated by removing all dust and dirt therefrom.

The housing 11 is mounted on a unit foundation 15 and within which there is a spring-supported element support 16 that is located over an electric vibrating motor 17 that is connected to one end of an extension cord 18 extending outwardly of the unit foundation, the outer end of extension cord having a male electric plug 19 secured thereto for purpose of securement to a house electric outlet socket.

An air line 20 extends from the outside and into the housing 11, the inner end of the air line 20 being connected to a revolving air distributor 21.

One end of a flexible hose 22 is connected to the housing 11, the other end of the flexible hose being connected to an inlet 23 at an upper end of a vacuum unit 24.

The lower end of the vacuum unit 24 is provided with an outlet 25.

It will now be evident that in operative use, vibration, a central air blast from the revolving air distributor and a pneumatic vacuum from the vacuum unit are all three employed so as to remove all dust and dirt from the automobile air cleaner unit 14.

The blast of air is from the inside out while the vibration shakes all dust and dirt loose which is then drawn off by the vacuum unit.

After cleaning, the automobile air cleaning element can be reinstalled in the vehicle.

Thus there is provided a renovator for an automobile air cleaning element which will save on gasoline consumption for the motorist, and wherein the cleaning can be accomplished in a quick manner.

What I now claim is:

1. In a renovator for cleaning an automobile air cleaning unit, the combination of a cylindrical housing, said housing having a removable circular cover plate on top thereof, said housing and said cover plate forming an enclosure for a central chamber within which said automobile air cleaning unit can be placed during a cleaning operation, an air inlet line extending from an exterior forced air source into said chamber, the terminal end of said line extending vertically upward and into said air cleaning unit, a revolvable air distributor fitted on said inlet line end for rotating in a horizontal plane about said line end, said line end having radial openings communicating with a duct through said distributor so that air from said inlet line is passed through said distributor and is blasted against an inner side wall of said air cleaning unit, said distributor being of arcuate shape so that air blasting therefrom causes said distributor to rotate, a horizontal platform inside said chamber and upon which said air cleaning unit is placed, a central opening through said platform, said air inlet line end extending upward through said opening, said platform being supported upon the upper end of a plurality of compression coil springs in upright position supported on a bottom wall of said housing, an electric vibrating motor secured to an underside of said platform for vibrating the same, an electric cord extending from said motor outwardly of said housing for connection to a power source, and a vacuum line hose communicating at one end with said chamber, the other end of said hose extending from said housing to an upper inlet of a vacuum unit having an air outlet near its lower end.

* * * * *